Jan. 9, 1968   D. D. MARSHALL ET AL   3,362,562

FLOATING COVERS FOR LIQUID STORAGE TANKS

Filed Jan. 4, 1966                     2 Sheets-Sheet 1

INVENTORS
DAVID DOBIE MARSHALL
IRENE MARY NAYLER
BY:
Norris + Bateman
Attorneys

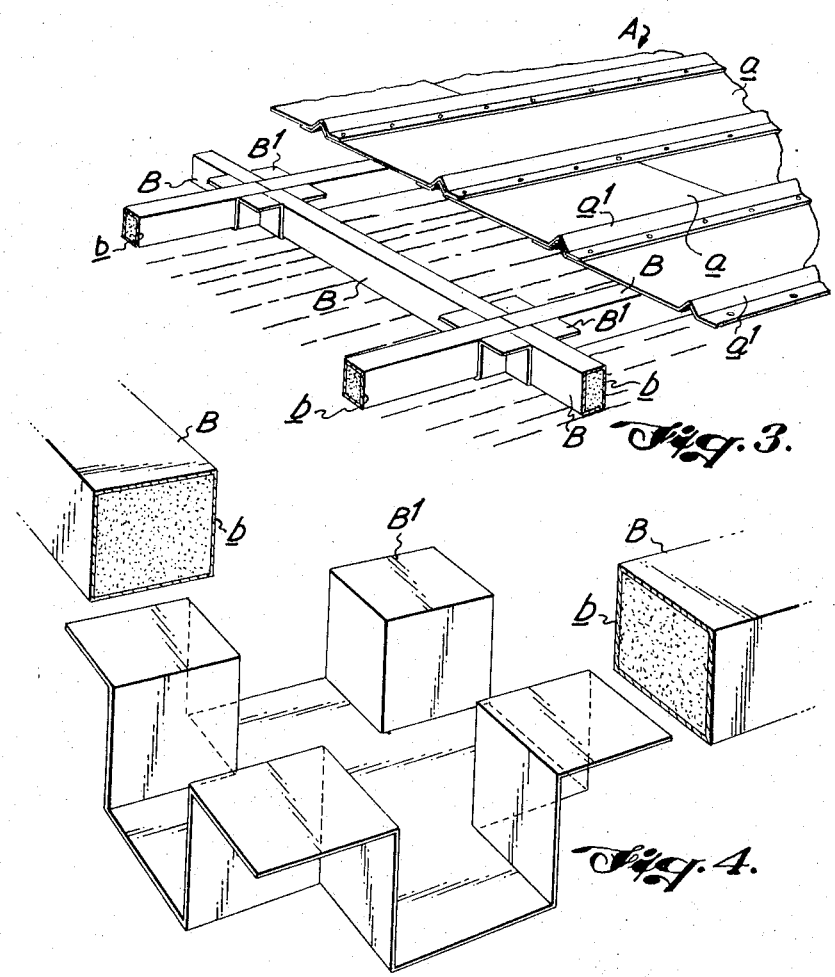

3,362,562
FLOATING COVERS FOR LIQUID
STORAGE TANKS
David D. Marshall, Salford, and Irenie M. Nayler, Dudley,
England, assignors to Greengate & Irwell Rubber Company Limited, Irwell Works, and Greengate Works,
Salford, England, a corporation of Great Britain and
Nayler (Petroseals) Limited, Dudley, England
Filed Jan. 4, 1966, Ser. No. 518,663
Claims priority, application Great Britain,
Jan. 6, 1965, 505/65
3 Claims. (Cl. 220—26)

This invention relates to improvements in floating covers for liquid storage tanks.

In the specification of our co-pending application Ser. No. 427,674 now Patent No. 3,288,322 there is described a floating cover constructed from a plurality of sheets of fibre glass built up into units and secured together in situ to provide a buoyant cover capable of floating on the liquid in the tank, each sheet being supported on a buoyant frame of urethane foam to define therewith a unit, the units being protected by a protective resin and the present application is an improvement thereon.

The invention comprises a unit framework of urethane logs each enclosed in a fibre glass envelope and supported at the ends by cruciform channels members, and sheets of fibre glass, bolted to the unit framework, each sheet being moulded with a reinforcive rib adjacent the longitudinal edges of each sheet.

The invention will be described with reference to the accompanying drawings:

FIG. 3 is a perspective view of a blanket partly in section and the logs on which it rests.

FIG. 4 is a perspective view of a junction member for supporting the ends of four logs.

A liquid storage tank C is provided with a floating blanket A formed of fibre glass sheets $B^a$ supported on units D constructed from urethane logs $b$ each enclosed in a fibre glass envelope $b$. The blanket A is built up from a plurality of fibre glass sheets $a$ each moulded with a longitudinal rib $a^1$ adjacent each edge the ribs $a^1$ being preferably triangular in cross section. The sheets $a$ are assembled as shown in FIG. 3 with a rib $a^1$ of one sheet overlapping a rib $a^1$ of a adjacent sheet, the overlapping portions of the two being bolted together.

Figure 1:
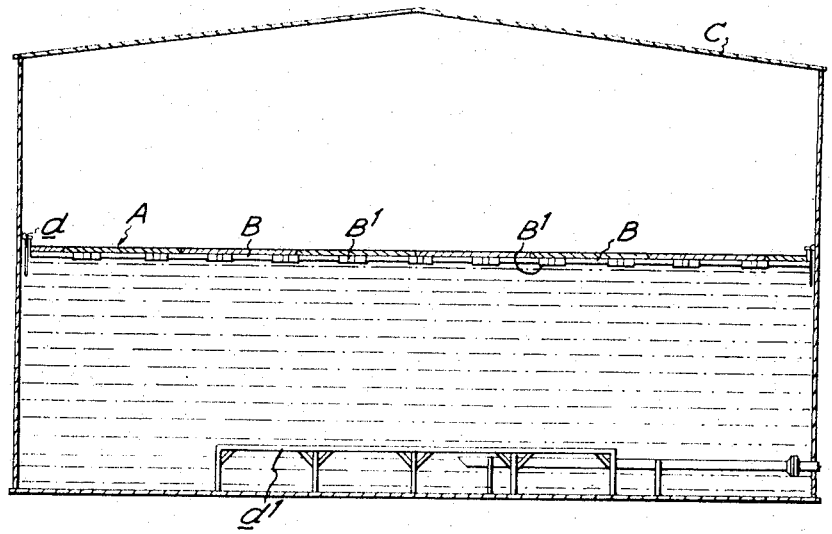
FIG. 1 is a transverse elevation through a tank showing a floating blanket thereon.
Figure 2:
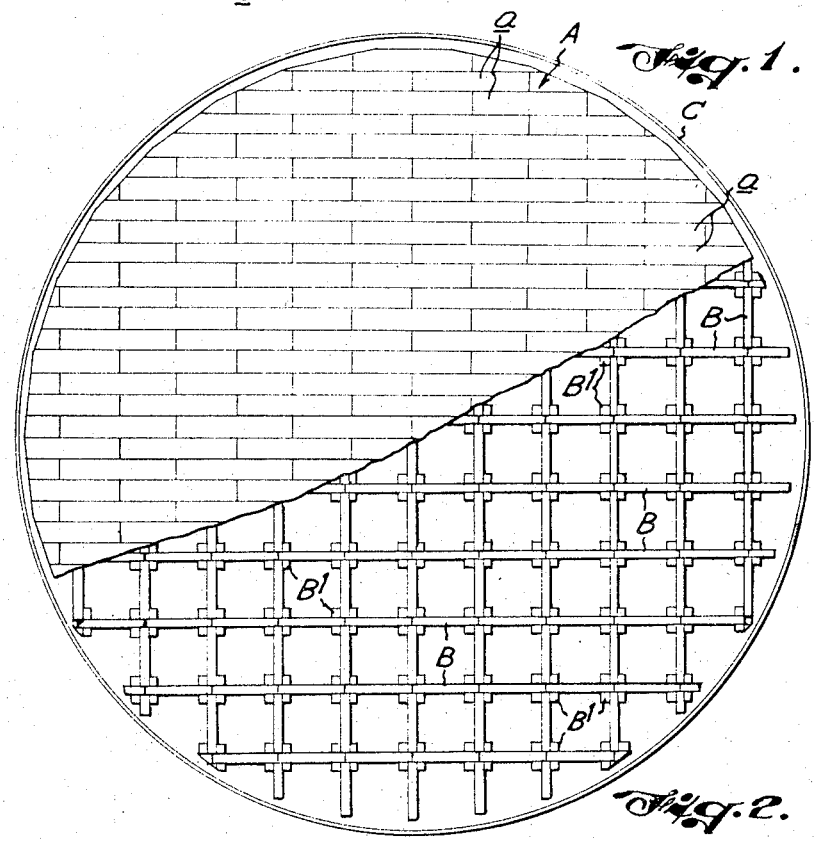
FIG. 2 is a plan of the tank and blanket (partly broken away).

The sheets $a$ are supported on the urethane logs B arranged longitudinally and transversely of the sheets to form a framework unit to float on the liquid in the tank. The ends of the logs B are carried in cruciform channel members B each formed of sheet metal as shown in FIG. 4 into which the ends of four logs are mounted as shown in FIG. 2. The logs are bolted to the channel members to form the unit framework or raft to float on the surface of the liquid.

The logs B are enclosed in the fibre glass envelope $b$ to protect the logs and the edges of the sheets $a$ prefarably overlap the ends of the logs B around the periphery of the blanket.

The ribs $a^1$ limit the flexibility of the sheets $a$, and the sheets may be bolted to the logs between the ribs.

A sealing ring $d$ is bolted to brackets around the peripheral edges of the blanket A to form a sliding seal with the wall of the tank in known manner and may be provided with an anti static cable affixed to the cover and with apertures thereon to receive a sampling match, dip stick and drainage. The assembly of the frame work unit and sheets may be carried out on a stand $d^1$ arranged on the bottom of the tank.

What we claim is:

1. A floating cover for a liquid storage tank comprising a unit framework of urethane logs, a fibre glass envelope enclosing each log, cruciform channel members supporting the ends of the logs, sheets of fibre glass bolted to the unit framework, and ribs on each sheet adjacent the longitudinal edges thereof, the sheets being assembled with a rib on one sheet overlapping a rib on an adjacent sheet.

2. A floating cover for a liquid storage tank as in claim 1 in which the ribs on the sheets are of triangular shape in cross section.

3. A floating cover for a liquid storage tank as in claim 1 in which the overlapping edges of the sheets are bolted together.

No references cited.

DONALD F. NORTON, Primary Examiner.

J. B. MARBERT, Assistant Examiner.